(12) United States Patent
Suzuki (10) Patent No.: US 10,416,649 B2
(45) Date of Patent: Sep. 17, 2019

(54) NUMERICAL CONTROLLER THAT PREVENTS A TOOL COMPENSATION VALUE SETTING ERROR

(71) Applicant: FANUC CORPORATION, Minamitsuru-gun, Yamanashi (JP)

(72) Inventor: Makoto Suzuki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 86 days.

(21) Appl. No.: 15/715,262

(22) Filed: Sep. 26, 2017

(65) Prior Publication Data

US 2018/0088554 A1  Mar. 29, 2018

(30) Foreign Application Priority Data

Sep. 28, 2016  (JP) .................. 2016-190094

(51) Int. Cl.
*G06F 19/00*  (2018.01)
*G05B 19/404*  (2006.01)

(52) U.S. Cl.
CPC .. *G05B 19/404* (2013.01); *G05B 2219/39177* (2013.01); *G05B 2219/45044* (2013.01)

(58) Field of Classification Search
CPC .................................................. G05B 19/408
USPC ....................................................... 700/159
See application file for complete search history.

(56) References Cited

U.S. PATENT DOCUMENTS

| 4,533,286 | A | * | 8/1985 | Kishi | G05B 19/41 318/572 |
| 5,513,113 | A | * | 4/1996 | Okada | G05B 19/404 483/11 |
| 5,544,046 | A | * | 8/1996 | Niwa | G05B 19/408 700/159 |
| 7,328,082 | B2 | * | 2/2008 | Endo | G05B 19/4015 33/630 |
| 2016/0116899 | A1 | * | 4/2016 | Piner | G05B 19/404 700/173 |
| 2016/0288285 | A1 | * | 10/2016 | Piner | B23Q 15/12 |

FOREIGN PATENT DOCUMENTS

| JP | 09204214 | A | * | 8/1997 |
| JP | H 10-180591 | A |   | 7/1998 |
| JP | 11090776 | A | * | 4/1999 |
| JP | 2002-307263 | A |   | 10/2002 |

\* cited by examiner

*Primary Examiner* — Suresh Suryawanshi
(74) *Attorney, Agent, or Firm* — RatnerPrestia (57) ABSTRACT

A numerical controller corrects a tool compensation value for a machine tool provided with a tool for machining a workpiece based on an NC machining program. The numerical controller makes it unnecessary for a person in charge of input to be conscious of the sign of the tool compensation value and prevents a tool compensation value input error by providing an input button for bringing a workpiece and a tool cutting edge close to each other by a specified amount (+input advance) and an input button for causing the workpiece and the tool cutting edge to be away from each other by a specified amount (+input retreat) at the time of inputting the tool compensation value.

6 Claims, 7 Drawing Sheets

FIG. 1

| TOOL COMPENSATION | | | | | |
|---|---|---|---|---|---|
| NUMBER | X AXIS | Z AXIS/LENGTH | Y AXIS | CUTTING EDGE R/ RADIUS | T |
| 001 W | 0.0000 | 0.0000 | 0.0000 | 0.0000 | 0 |
| G | 0.0000 | 0.0000 | 0.0000 | 0.0000 | |
| 002 W | 0.0000 | 0.0000 | 0.0000 | 0.0000 | 0 |
| G | 0.0000 | 0.0000 | 0.0000 | 0.0000 | |
| 003 W | 0.0000 | 0.0000 | 0.0000 | 0.0000 | 0 |
| G | 0.0000 | 0.0000 | 0.0000 | 0.0000 | |
| 004 W | 0.0000 | 0.0000 | 0.0000 | 0.0000 | 0 |
| G | 0.0000 | 0.0000 | 0.0000 | 0.0000 | |
| 005 W | 0.0000 | 0.0000 | 0.0000 | 0.0000 | 0 |
| G | 0.0000 | 0.0000 | 0.0000 | 0.0000 | |
| 006 W | 0.0000 | 0.0000 | 0.0000 | 0.0000 | 0 |
| G | 0.0000 | 0.0000 | 0.0000 | 0.0000 | |

O0001 N00000000

ABSOLUTE COORDINATES

X  10.9333
Y  6.4000
Z  9.0667
B  0.0000
C  0.0000

A>_

MEM  ** * ***  14:23:22

| < | NUMBER SEARCH | +INPUT ADVANCE | +INPUT RETREAT | +INPUT | INPUT | DELETE | F INPUT | F OUTPUT |

+INPUT ADVANCE BUTTON/
+INPUT RETREAT BUTTON

CUTTING TOOL FOR OUTER DIAMETER:
CORRECTION IS PERFORMED IN DIRECTION OF TOOL CUTTING EDGE COMING CLOSE (ADVANCING) TO WORKPIECE BY PERFORMING SUBTRACTION FROM TOOL COMPENSATION AMOUNT ON X AXIS

CUTTING TOOL FOR INNER DIAMETER:
CORRECTION IS PERFORMED IN DIRECTION OF TOOL CUTTING EDGE COMING CLOSE (ADVANCING) TO WORKPIECE BY PERFORMING ADDITION TO TOOL COMPENSATION AMOUNT ON X AXIS

FIG. 8 (PRIOR ART)

| TOOL COMPENSATION | | | | | O0001 N00000000 | |
|---|---|---|---|---|---|---|
| NUMBER | X AXIS | Z AXIS/LENGTH | Y AXIS | CUTTING EDGE R/ RADIUS | T | ABSOLUTE COORDINATES |
| 001 W | 0.0000 | 0.0000 | 0.0000 | 0.0000 | 0 | X  10.9333 |
| G | 0.0000 | 0.0000 | 0.0000 | 0.0000 | | Y   6.4000 |
| 002 W | 0.0000 | 0.0000 | 0.0000 | 0.0000 | 0 | Z   9.0667 |
| G | 0.0000 | 0.0000 | 0.0000 | 0.0000 | | B   0.0000 |
| 003 W | 0.0000 | 0.0000 | 0.0000 | 0.0000 | 0 | C   0.0000 |
| G | 0.0000 | 0.0000 | 0.0000 | 0.0000 | | |
| 004 W | 0.0000 | 0.0000 | 0.0000 | 0.0000 | 0 | |
| G | 0.0000 | 0.0000 | 0.0000 | 0.0000 | | |
| 005 W | 0.0000 | 0.0000 | 0.0000 | 0.0000 | 0 | |
| G | 0.0000 | 0.0000 | 0.0000 | 0.0000 | | |
| 006 W | 0.0000 | 0.0000 | 0.0000 | 0.0000 | 0 | |
| G | 0.0000 | 0.0000 | 0.0000 | 0.0000 | | |

A>

MEM  ** * ***  14:23:22

| NUMBER SEARCH | | | +INPUT | INPUT | DELETE | F INPUT | F OUTPUT |

NUMERICAL CONTROLLER THAT PREVENTS A TOOL COMPENSATION VALUE SETTING ERROR

BACKGROUND OF THE INVENTION

1. Field of the Invention

The present invention relates to a numerical controller, and more particularly to a numerical controller that prevents a tool compensation value setting error.

2. Description of the Related Art

In a machine tool controlled by a numerical controller, a machined shape of a workpiece (an object to be machined) is decided by how the cutting edge of a tool is to be moved relative to the workpiece. On the other hand, what is controlled by the numerical controller is a relative positional relationship between a spindle or a table to which the workpiece is fixed and a tool holder (or a tool holder) to which the tool is fitted.

Various kinds of tools according to machining types are fitted to the tool holder. Since the amount and direction of protrusion from the tool holder differs according to the tools, it is not possible to perform desired machining unless a positional relationship between a reference position of the tool holder (a position recognized or controlled by the numerical controller) and the tool cutting edge is registered with the numerical controller in advance. Therefore, when attaching a tool to the tool holder, a worker sets a position of the tool cutting edge based on the reference position of the tool holder (a tool compensation value) in the numerical controller.

The tool compensation value set in the numerical controller is a tool length or a tool diameter measured with a measuring instrument. Further, there is also a method in which a tool setter provided with a detection sensor for detecting a tool cutting edge, such as a proximity switch and a touch sensor, is arranged at a predetermined position, and, by fitting a tool to a tool holder and then moving the tool holder to detect the tool cutting edge by the detection sensor, a tool compensation value is automatically set in the numerical controller based on a position of the tool holder when a detection signal is received.

Figure 8:
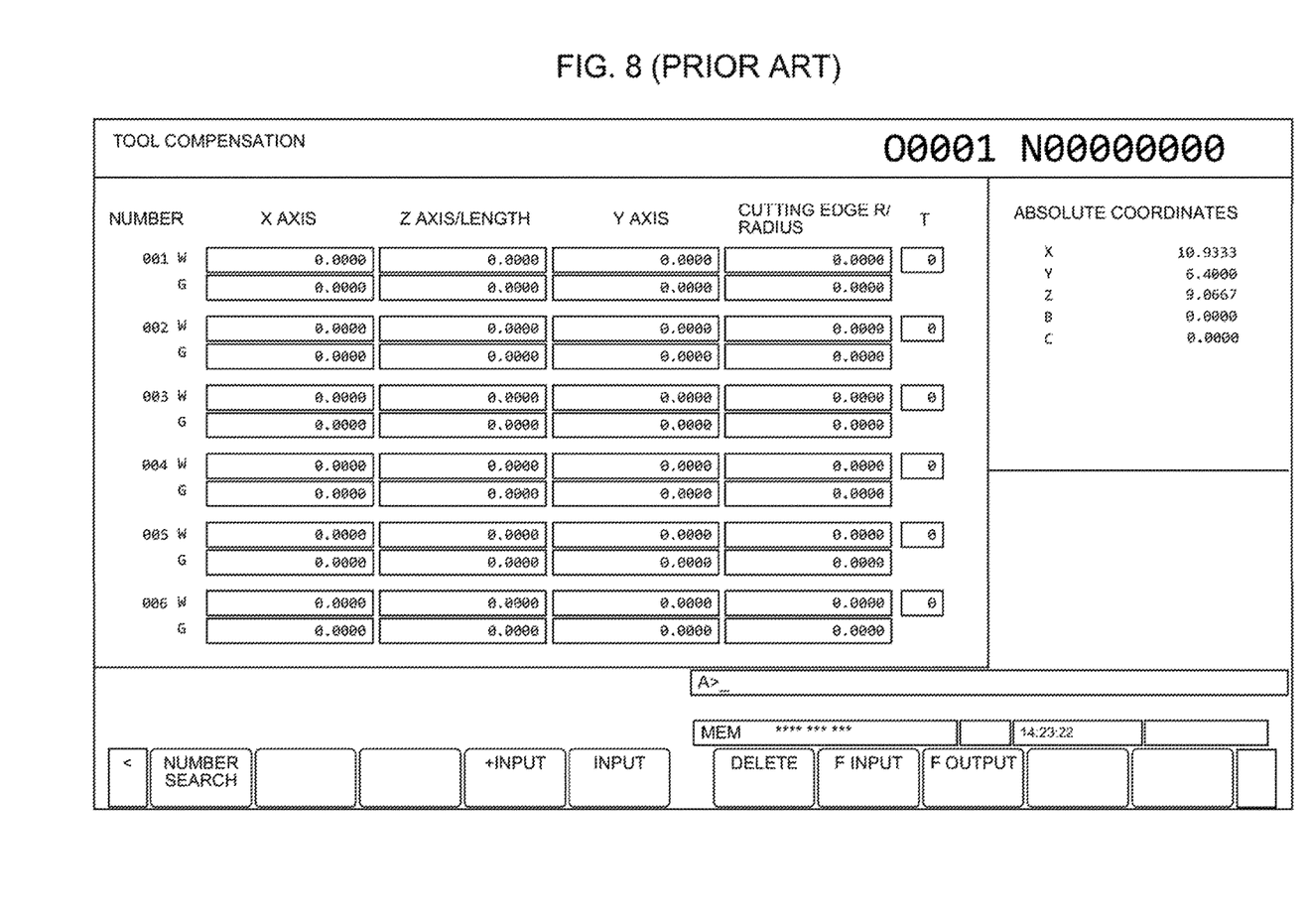
FIG. 8 is a diagram showing an example of a tool compensation value setting screen according to the conventional technique.

Setting of the tool compensation value is performed on a tool compensation value setting screen as shown in FIG. 8.

Setting of the tool compensation value is performed by an [INPUT] button for setting an inputted value as a tool compensation value as it is or a [+INPUT] button for inputting a difference from a tool compensation value that has already been set to set a new tool compensation value.

In a numerically controlled machine tool that automatically machines a workpiece, by inputting dimensions shown on a drawing of the workpiece to a machining program and setting tool compensation values for a tool to be used for machining, the workpiece ought to be machined according to the dimensions. In reality, however, there may be a case where the workpiece can not be finished to desired dimensions because of wear of the tool, a temperature condition, a mechanical factor and the like. Therefore, dimensions of the machined workpiece are measured, and the tool compensation values are changed based on differences (dimension errors) between the measured values and the target dimensions.

Figure 9:
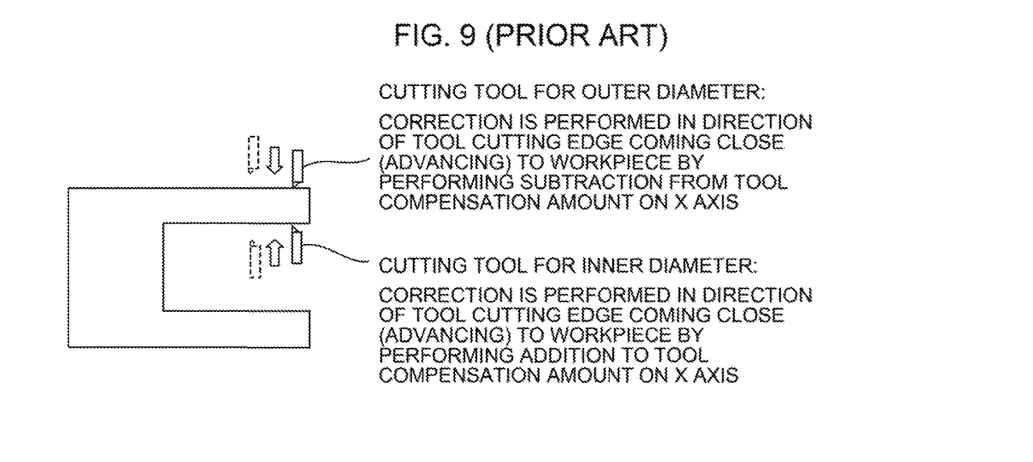
FIG. 9 is a diagram illustrating a relationship between a state of machining and a correction direction of a tool.

In the case of changing the tool compensation values based on the dimension errors, whether the dimension errors are to be added to or subtracted from the tool compensation values already set depends on a tool type and a machining method. For example, as shown in FIG. 9, in the case of a lathe-turning tool for outer diameter, correction is performed in a direction in which the tool cutting edge comes close (advances) to a workpiece by subtracting a dimension error from a tool compensation value in an X-axis direction. On the other hand, in the case of a lathe-turning tool for inner diameter, correction is performed in a direction in which the tool cutting edge comes close to a workpiece by adding a dimension error to a tool compensation value in the X-axis direction. Specifically, if, for a part machined by the lathe-turning tool for outer diameter, a target dimension is 100.0 mm, and a result of measuring a dimension of the machined workpiece is 100.5 mm, then correction is modified in a direction in which the tool cutting edge comes close to the workpiece by 0.5 mm, by subtracting a dimension error 0.5 mm (0.25 mm in the case of inputting a radius value) from a tool compensation value that has already been set. Thereby, it can be expected to be closer to the target dimension at the next machining. On the other hand, if, for a part machined by the lathe-turning tool for inner diameter, a target dimension is 80.0 mm, and a result of measuring a dimension of the machined workpiece is 79.5 mm, then correction is modified in the direction in which the tool cutting edge comes close (advances) to the workpiece by 0.5 mm, by adding a dimension error 0.5 mm (0.25 mm in the case of inputting a radius value) to a tool compensation value that has already been set. Thereby, it can be expected to be closer to the target dimension at the next machining.

As described above, in the case of changing a tool compensation value, whether to perform addition to or subtraction from a tool compensation value that has already been set in order to change a target correction amount depends on a tool type and a machining method. Therefore, there is a problem that a tool compensation value setting error easily occurs. Solutions for such a problem are disclosed in Japanese Patent Laid-Open No. 2002-307263 and Japanese Patent Laid-Open No. 10-180591.

In a method disclosed in Japanese Patent Laid-Open No. 2002-307263, a result of measurement of a machined workpiece by a measuring device is taken into a particular application in a numerical controller, and, in this application, a tool wear correction amount is calculated from the measurement result and stored. Then, at the time of executing an instruction to read the tool wear correction amount in a machining program for machining the workpiece, the tool wear correction amount described above is read. Thereby, manual setting is unnecessary.

Further, in a method disclosed in Japanese Patent Laid-Open No. 10-180591, any shape pattern is selectively displayed on a screen of display means from among a plurality of workpiece shape patterns, and measurement positions of dimensions of a workpiece and input fields for inputting actually measured values in association with the measurement positions are displayed together with the displayed shape pattern. Then, by, while checking the measurement positions of the dimensions of the workpiece displayed on the display means, inputting the actually measured values of the machined workpiece corresponding to the measurement positions, calculating error amounts from differences between reference values of the measurement positions and the actually measured values which have been inputted, and calculating a correction amount for a position in each coordinate axis direction of a tool according to the calculated correction amount, a tool compensation value setting error is prevented.

These methods are effective as a method for preventing a tool compensation value setting error at the time of measuring dimensions of a machined workpiece and changing a tool compensation value based on differences between the measured values and target dimensions (dimension errors). In the case of changing a tool compensation value for purposes other than the above, however, there is a problem that it is not possible to prevent a tool compensation value setting error. Specifically, the following can be conceivable as the case of changing a tool compensation value for purposes other than the above.

For example, a case is conceivable where it is not permissible to shave off too much relative to a target dimension. When outer diameter machining is considered as an example, to shave off too much means that an obtained dimension is smaller than a target dimension. In this case, if a tool compensation value set by measuring a tool or a tool compensation value set using the tool setter described before is used as it is to perform machining, there is a possibility of shaving off too much. Therefore, the tool compensation value is changed so that the tool cutting edge is away from a workpiece, to perform machining, and a dimension of the machined workpiece is measured to determine a difference (a dimension error) between the measured value and a target dimension. Since there is a possibility of shaving off too much if the whole dimension error determined here is reflected on the tool compensation value. Therefore, for example, a half of the dimension error is reflected on the tool compensation value, and machining is performed again. In this way, dimension measurement of the machined workpiece and change in the tool compensation value are repeatedly performed until a specified tolerance is reached. In such work, however, it becomes necessary to manually set a tool compensation value on the tool compensation value setting screen, and it is not possible to prevent a tool compensation value setting error by the conventional techniques described before, the methods disclosed in Japanese Patent Laid-Open No. 2002-307263 and Japanese Patent Laid-Open No. 10-180591.

SUMMARY OF THE INVENTION

Thus, an object of the present invention is to provide a numerical controller capable of preventing a tool compensation value setting error.

In the numerical controller of the present invention, for preventing a setting error of tool compensation value, tool compensation value setting buttons are provided that clearly show an influence of change in the tool compensation value on a relationship between a workpiece and a tool cutting edge, that is, whether the tool cutting edge is to be close to the workpiece or to be away from the workpiece, at the time of inputting a difference from a tool compensation value that has already been set and setting a result as a new tool compensation value on a tool compensation value setting screen.

The numerical controller according to the present invention is a numerical controller correcting a tool compensation value for a machine tool provided with a tool for machining a workpiece based on an NC machining program, the numerical controller comprising: a tool compensation value setting screen for accepting an input value for correction of the tool compensation value; a tool compensation value input unit accepting an instruction for a correction direction of a cutting edge of the tool as seen from the workpiece; and a tool compensation value input control unit correcting the tool compensation value with the input value for correction, accepted on the tool compensation value setting screen, based on the correction direction of the cutting edge of the tool as seen from the workpiece, the correction direction being accepted by the tool compensation value input unit.

The correction direction of the cutting edge of the tool as seen from the workpiece may include at least any of a direction of bringing the cutting edge of the tool close to the workpiece and a direction of the cutting edge of the tool going away from the workpiece.

The numerical controller further comprises a tool compensation information storage unit storing increase/decrease in the tool compensation value according to the correction direction of the cutting edge of the tool as seen from the workpiece in association with each tool; wherein the tool compensation value input control unit may determine whether to perform correction of adding the input value to the tool compensation value or to perform correction of subtracting the input value from the tool compensation value, with reference to the tool compensation information storage unit.

The numerical controller further comprises a tool compensation information storage unit in which, for each tool, a direction of a cutting edge of the tool is set and stored; wherein the tool compensation value input control unit may determine whether to perform correction of adding the input value to the tool compensation value or to perform correction of subtracting the input value from the tool compensation value, with reference to the tool compensation information storage unit.

Whether the input value for correction is to be inputted as a diameter value or as a radius value is settable for each tool in the tool compensation information storage unit; and the tool compensation value input control unit may determine whether the input value is to be treated as a diameter value or a radius value with reference to the tool compensation information storage unit.

The numerical controller further comprises a machine configuration information storage unit in which a general cutting edge direction is set for each machine; wherein the tool compensation value input control unit may determine whether to perform correction of adding the input value to the tool compensation value or to perform correction of subtracting the input value from the tool compensation value, with reference to the machine configuration information storage unit.

By the numerical controller according to the present invention being provided with the above components, a worker can set a tool compensation value using the tool compensation value setting buttons clearly showing whether a tool cutting edge is to be close to or away from a workpiece, and, therefore, it is possible to prevent a tool compensation value setting error.

DETAILED DESCRIPTION OF THE PREFERRED EMBODIMENT

An embodiment of the present invention will be described with reference to the drawings. Components that are the same as or similar to those of a conventional technique will be described with the same reference numerals.

Figure 1:
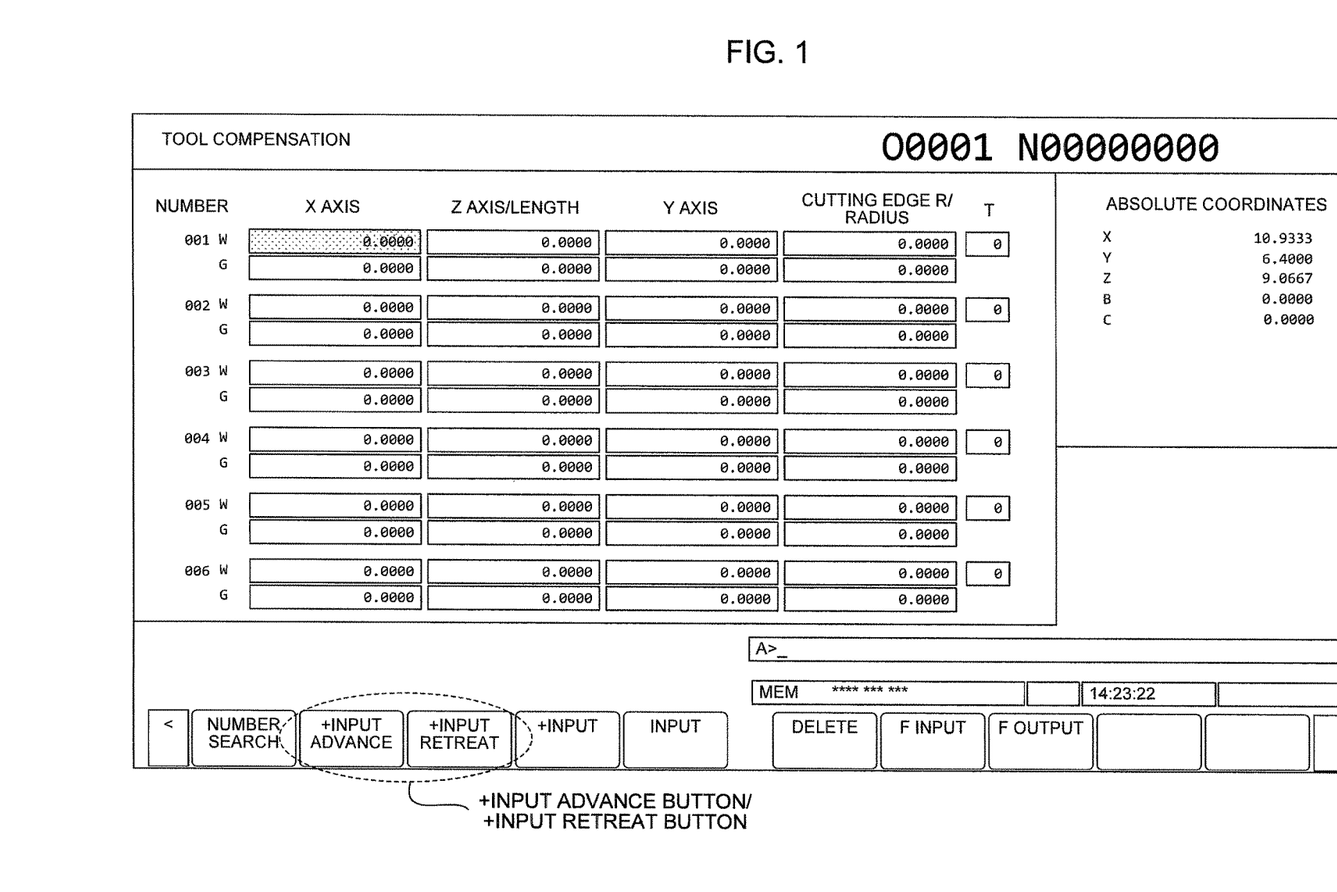
FIG. 1 is a diagram showing an example of a tool compensation value setting screen according to an embodiment of the present invention.

In the present invention, as shown in FIG. 1, a tool compensation value setting error is prevented, and the problem of the conventional technique described before is solved by providing tool compensation value setting buttons, a [+INPUT ADVANCE] button and a [+INPUT RETREAT] button, which clearly show influence of a change made in the tool compensation value on a relationship between a workpiece and a tool cutting edge, that is, whether the tool cutting edge is to be close (advance) to the workpiece or to be away (retreat) from the workpiece, at the time of setting a new tool compensation value to which a value inputted on a tool compensation value setting screen (a value of difference from a tool compensation value that has already been set) is applied.

Figure 2:
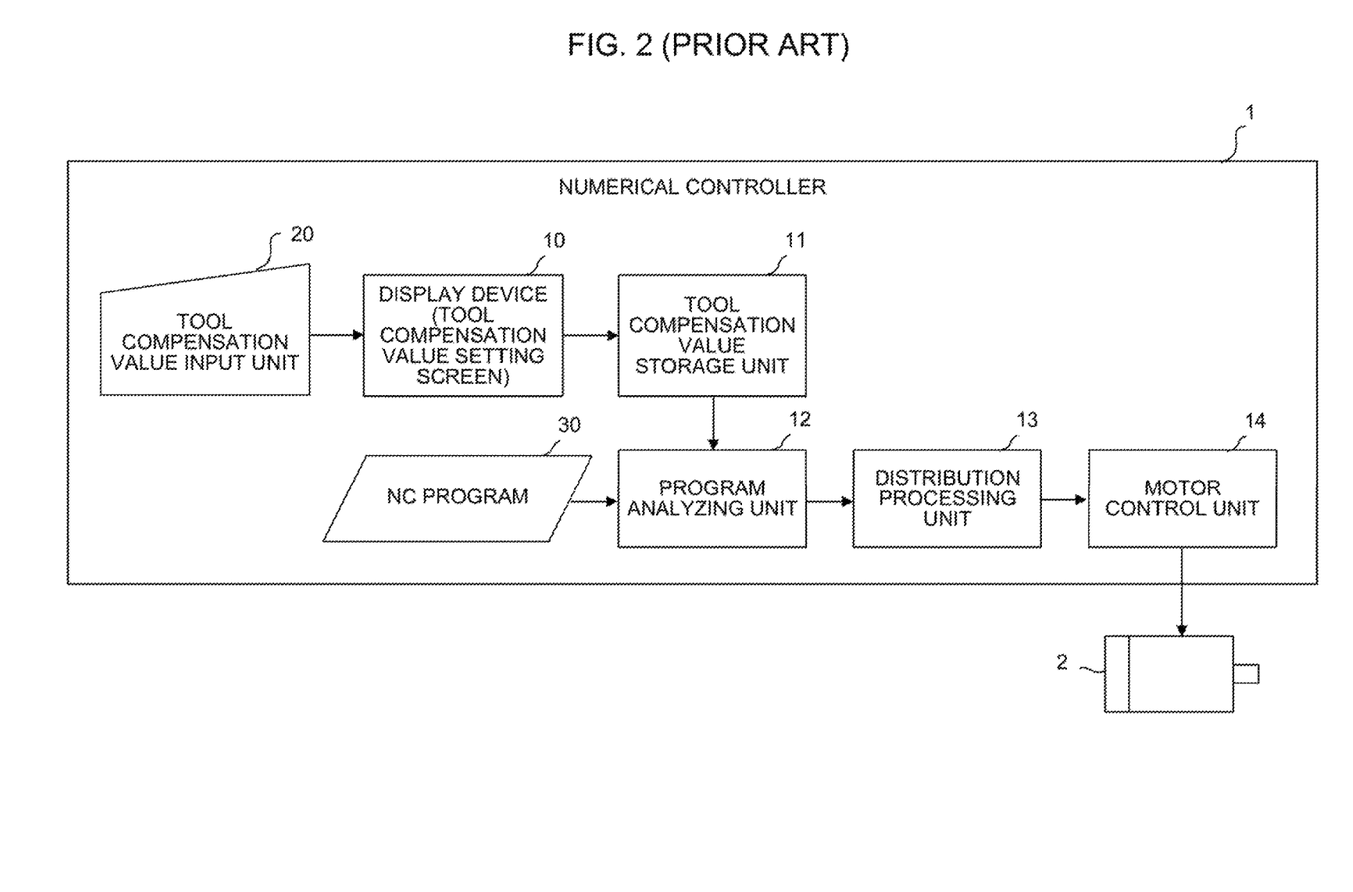
FIG. 2 is a schematic functional block diagram of a numerical controller according to a conventional technique.

FIG. 2 is the functional block diagram of a numerical controller according to the conventional technique.

A numerical controller 1 according to the conventional technique is provided with a display device (a tool compensation value setting screen) 10, a tool compensation value storage unit 11, a program analyzing unit 12, a distribution processing unit 13 and a motor control unit 14. A tool compensation value input unit 20 is connected to the numerical controller 1. FIG. 2 shows that one motor control unit 14 and one motor 2 are provided for simplification of explanation. Actually, however, the same numbers of motor control units 14 and motors 2 as the number of axes to be controlled are provided.

The tool compensation value input unit 20 is an input device, such as a keyboard and software keys, connected to the numerical controller 1 and is used for a worker to input a tool compensation value on the tool compensation value setting screen displayed on the display device 10. The tool compensation value inputted from the tool compensation value input unit 20 is stored in the tool compensation value storage unit 11.

The program analyzing unit 12 reads out an NC program 30 stored in a memory (not shown) or the like in the numerical controller 1 and analyzes the NC program 30. The program analyzing unit 12 uses the tool compensation value stored in the tool compensation value storage unit 11 in analyzing the NC program 30. A result of the analysis by the program analyzing unit 12 is outputted to the distribution processing unit 13.

The distribution processing unit 13 creates a distributed amount of movement, which is an amount of movement for each control cycle (an interpolation cycle) of the motor 2 to be controlled, based on a result analyzed by the program analyzing unit 12, and outputs the created distributed amount of movement to the motor control unit 14. Then, the motor control unit 14 controls drive of the motor 2 based on the distributed amount of movement inputted from the distribution processing unit 13.

Figure 3:
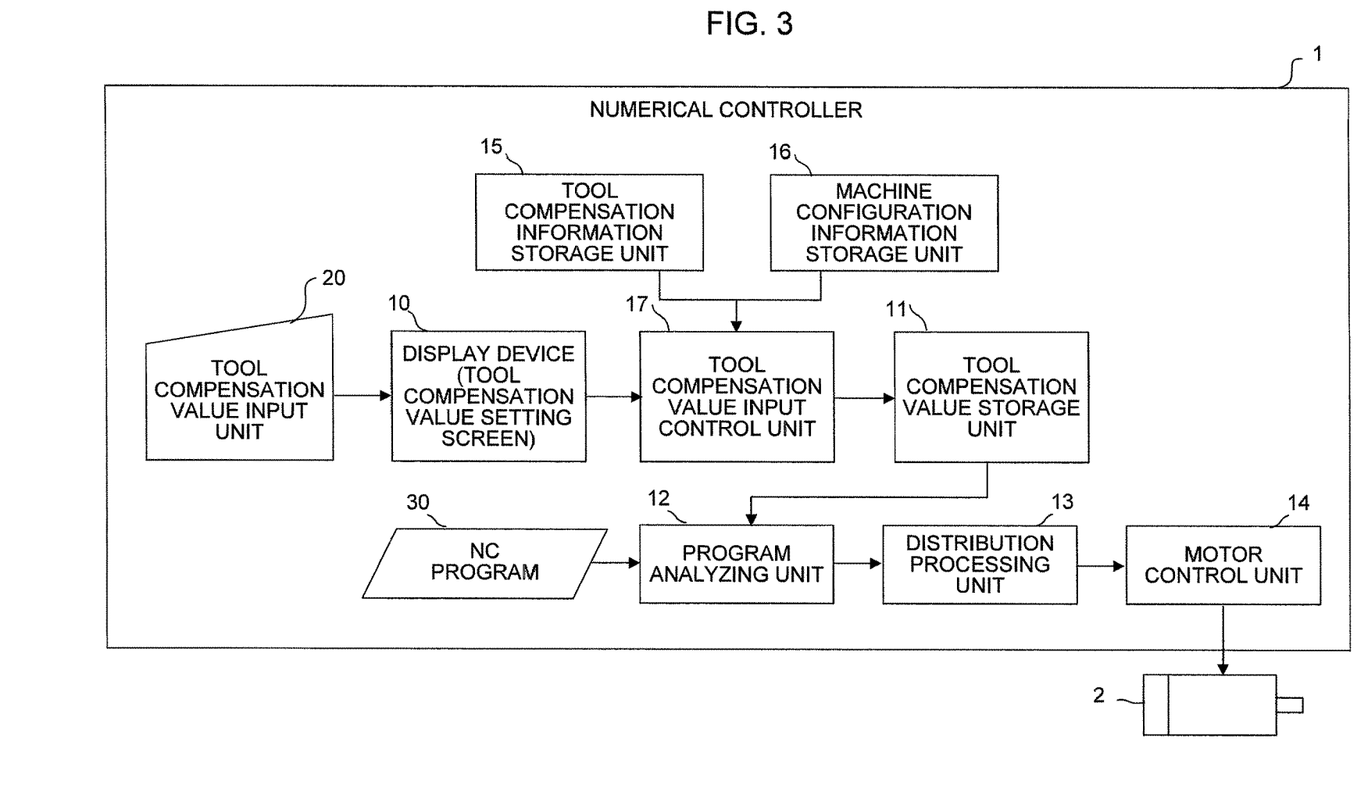
FIG. 3 is a schematic functional block diagram of a numerical controller according to the embodiment of the present invention.

FIG. 3 is a functional block diagram of a numerical controller according to the embodiment of the present invention. A numerical controller 1 of the present embodiment is provided with the display device (the tool compensation value setting screen) 10, the tool compensation value storage unit 11, the program analyzing unit 12, the distribution processing unit 13, the motor control unit 14, a tool compensation information storage unit 15, a machine configuration information storage unit 16 and, furthermore, a tool compensation value input control unit 17; and the tool compensation value input unit 20 is connected to the numerical controller 1. FIG. 3 shows that one motor control unit 14 and one motor 2 are provided for simplification of explanation. Actually, however, the same numbers of motor control units 14 and motors 2 as the number of axes to be controlled are provided. As described above, in the numerical controller 1 of the conventional technique, the tool compensation value inputted to the tool compensation value setting screen displayed on the display device 10 by the tool compensation value input unit 20 is stored in the tool compensation value storage unit 11 as it is. In comparison, in the numerical controller 1 of the present embodiment, the tool compensation value setting buttons clearly showing influence of a change made in a tool compensation value on a relationship between a workpiece and a tool cutting edge, that is, whether the tool cutting edge is to be close (advance) to the workpiece or to be away (retreat) from the workpiece, the [+INPUT ADVANCE] button and the [+INPUT RETREAT] button, are provided on the tool compensation value screen displayed on the display device 10 as shown in FIG. 1; and a value inputted with the use of these tool compensation value setting buttons (a value of difference from a tool compensation value that has already been set) is added to or subtracted from the tool compensation value by the tool compensation value input control unit 17 and stored in the tool compensation value storage unit 11.

The tool compensation value input control unit 17 decides whether the value (the value of difference from the tool compensation value that has already been set) inputted with the use of the tool compensation value setting button [+INPUT ADVANCE] or [+INPUT RETREAT] is to be added to or subtracted from the tool compensation value, based on information stored in the tool compensation information storage unit 15 or the machine configuration information storage unit 16.

In the tool compensation information storage unit 15, whether a value (a value of difference from a tool compensation value that has already been set) inputted by operating the tool compensation value setting button [+INPUT ADVANCE] or [+INPUT RETREAT] is to be added to or subtracted from the tool compensation value is set in association with each tool compensation number and stored in advance. The setting for each tool compensation number to be stored in the tool compensation information storage unit 15 may be made so that addition/subtraction of a difference value is directly associated with an operation of the tool compensation value setting button [+INPUT ADVANCE]/[+INPUT RETREAT] or may be made so that a relationship between the operation of the tool compensation value setting button [+INPUT ADVANCE]/[+INPUT RETREAT] and addition/subtraction of a difference value can be grasped by setting a direction of a cutting edge. The tool compensation value input control unit 17 can automatically determine whether a value (a value of difference from a tool compensation value that has already been set) inputted by operating the tool compensation value setting button [+INPUT ADVANCE]/[+INPUT RETREAT] is to be added to or subtracted from the tool compensation value by referring to the tool compensation information storage unit 15 (a method for determining addition/subtraction of an inputted value from a direction of a cutting edge will be described later).

As for such a tool that the influence of a change made in a tool compensation value on the relationship between a workpiece and a tool cutting edge is not uniquely determined depending on a situation of machining, a flag indicating unavailability of the tool compensation value setting buttons [+INPUT ADVANCE] and [+INPUT RETREAT] may be set for a tool compensation number corresponding to the tool in the tool compensation information storage unit 15. In that case, the tool compensation value setting buttons [+INPUT ADVANCE] and [+INPUT RETREAT] may be disabled to be pressed at the time of performing input for the tool compensation number for which the flag is set, from the tool compensation value setting screen, or control may be performed to change display on the screen, for example, to display an alert when the button is forcedly pressed. Further, in the tool compensation information storage unit 15, whether a value inputted from the tool compensation value setting screen is to be treated as a diameter value or a radius value may be set for each tool compensation number.

In the machine configuration information storage unit 16, general cutting edge directions determined according to machine configurations are set. The tool compensation value input control unit 17 automatically determines whether a value (a value of difference from a tool compensation value that has already been set) inputted by operating the tool compensation value setting button [+INPUT ADVANCE]/ [+INPUT RETREAT] is to be added to or subtracted from the tool compensation value by referring to the machine configuration information storage unit 16 when the setting for each tool compensation number is omitted in the tool compensation information storage unit 15 (a method for determining addition/subtraction of an inputted value from a machine configuration will be described later).

Figure 4:
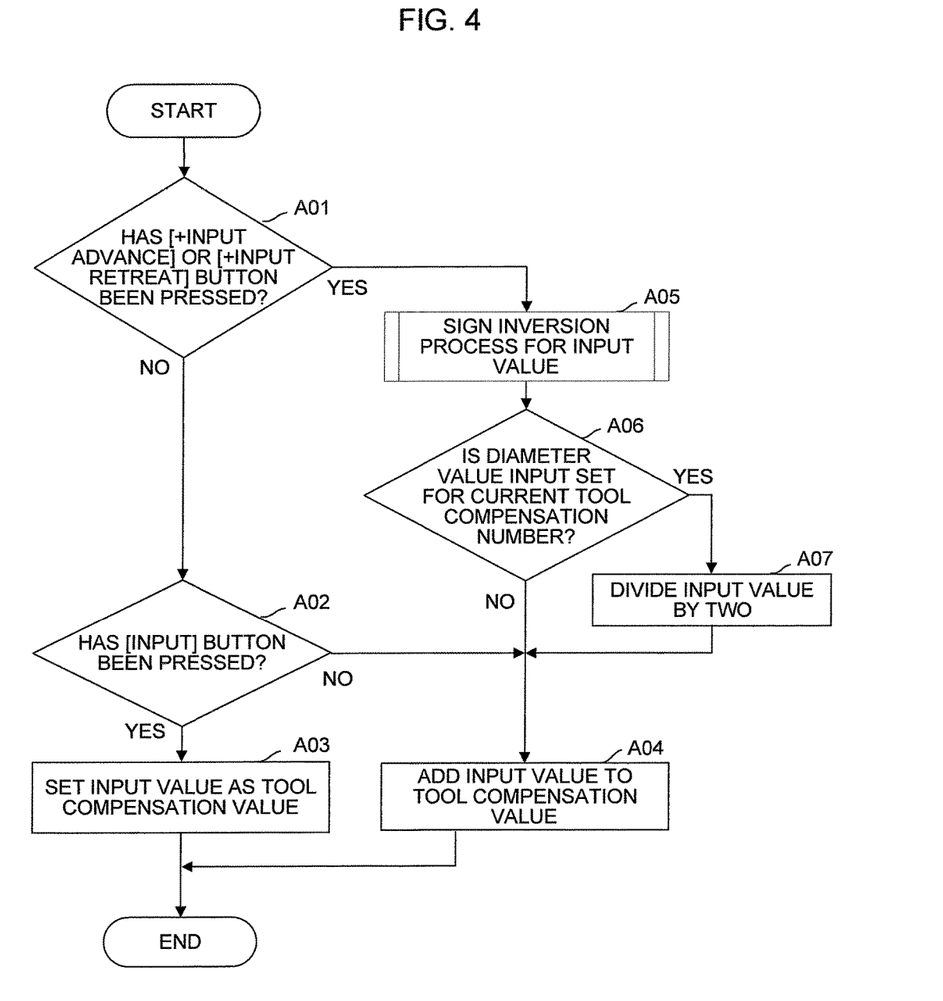
FIG. 4 is a flowchart showing a flow of setting a tool compensation value in the numerical controller shown in FIG. 3.

FIG. 4 is a flowchart showing a flow of setting a tool compensation value in the numerical controller 1 provided with the functional blocks shown in FIG. 3. The description will be given in line with each step of the flowchart.
[Step A01]
The numerical controller 1 accepts an input from a worker in a state where the tool compensation value setting screen is displayed on the display device 10 and determines whether the accepted input is from the tool compensation value setting button [+INPUT ADVANCE] or [+INPUT RETREAT]. If the input is from the tool compensation value setting button [+INPUT ADVANCE] or [+INPUT RETREAT], the process proceeds to step A05. Otherwise, the process proceeds to step A02.
[Step A02]
The numerical controller 1 determines whether the accepted input is from the tool compensation value setting button [INPUT] or not. If the input is from the tool compensation value setting button [INPUT], the process proceeds to step A03. Otherwise, the process proceeds to step A04 (because the input is from the tool compensation value setting button [+INPUT]).

[Step A03]
The numerical controller 1 stores the input value in the tool compensation value storage unit 11 as a tool compensation value.
[Step A04]
The numerical controller 1 adds the input value to a tool compensation value that has already been set and stores a result into the tool compensation value storage unit 11 as a new tool compensation value.
[Step A05]
The numerical controller 1 executes a sign inversion process (to be described later) for the input value by the tool compensation value input control unit 17 and replaces the input value with a result of the process.
[Step A06]
After checking a setting for a tool compensation number for which a tool compensation value is to be inputted, the numerical controller 1 determines whether or not it is set to treat an input value as a diameter value, by referring to the tool compensation information storage unit 15 or the like. With regard to the tool compensation number for which the tool compensation value is to be inputted, if it is not set to treat an input value as a diameter value (if it is set to treat an input value as a radius value), the process proceeds to step A04, whereas if it is set to treat an input value as a diameter value, the process proceeds to step A07.
[Step A07]
The numerical controller 1 replaces a value obtained by dividing the input value of which sign has been inversed at step A05 by two with the input value.

Figure 5:
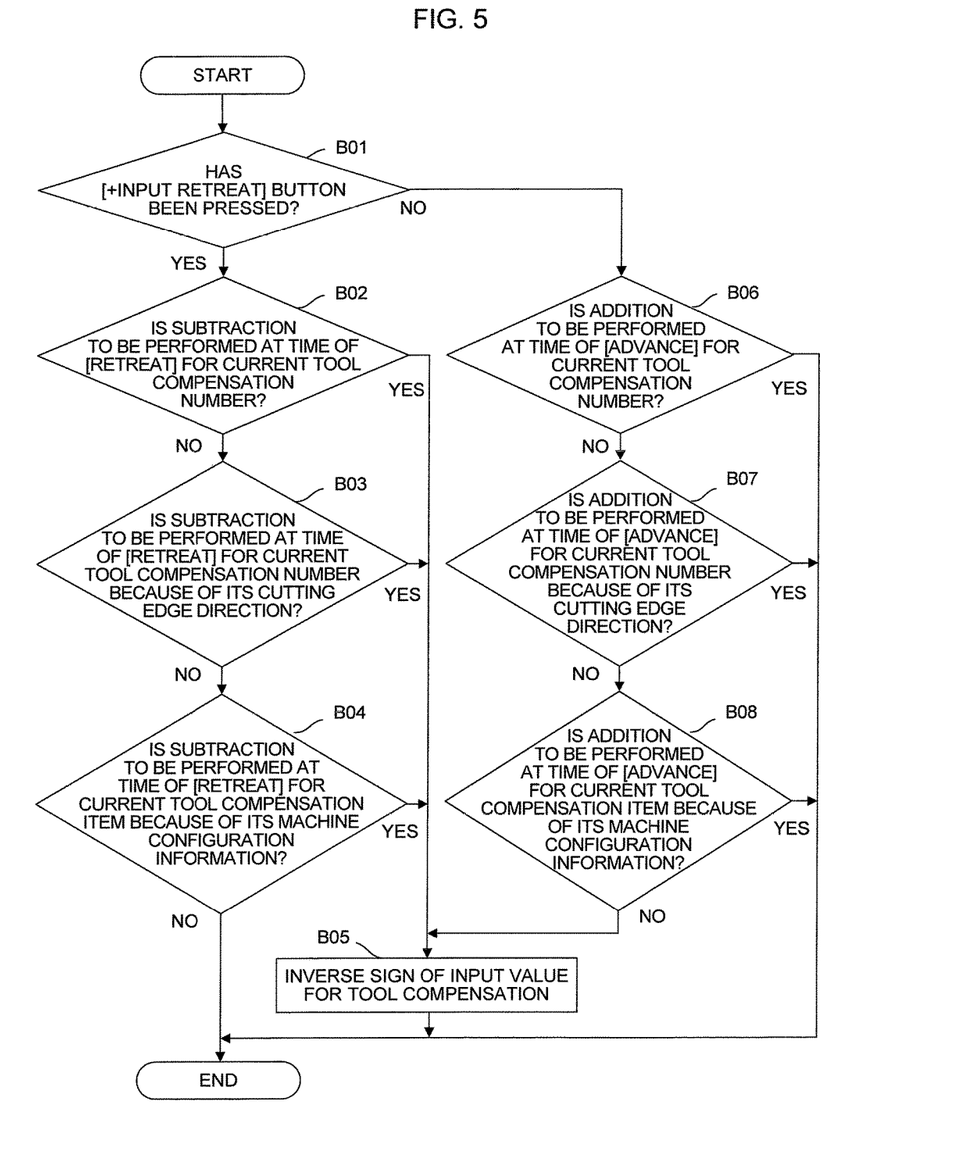
FIG. 5 is a flowchart showing a flow of an input value sign inversion process at step A05 in FIG. 4.

FIG. 5 is a flowchart showing a flow of the input value sign inversion process at step A05 in FIG. 4. The description will be given in line with each step of the flowchart.
[Step B01]
The tool compensation value input control unit 17 determines whether the input accepted at step A01 is from the tool compensation value setting button [+INPUT RETREAT] or not. If the input is from the tool compensation value setting button [+INPUT RETREAT], the process proceeds to step B02. Otherwise (if the input is from the tool compensation value setting button [+INPUT ADVANCE]), the process proceeds to step B06.
[Step B02]
After checking a setting for a tool compensation number for which a tool compensation value is currently to be inputted, the tool compensation value input control unit 17 refers to a setting stored in the tool compensation information storage unit 15 for the tool compensation number for which a tool compensation value is to be inputted, and determines whether or not it is set to subtract an input value from a tool compensation value that has already been set when the tool compensation value setting button [+INPUT RETREAT] is pressed. If it is set to subtract an input value, the process proceeds to step B05. Otherwise, the process proceeds to step B03.
[Step B03]
The tool compensation value input control unit 17 refers to a setting of cutting edge direction stored in the tool compensation information storage unit 15, for the tool compensation number for which a tool compensation value is currently to be inputted, and determines whether or not the cutting edge direction is set such that an input value is to be subtracted from a tool compensation value that has already been set when the tool compensation value setting button [+INPUT RETREAT] is pressed. If the cutting edge direction is such that an input value is to be subtracted, the process proceeds to step B05. Otherwise, the process proceeds to step B04.

[Step B04]

After checking a tool compensation item for a tool for which a tool compensation value is currently to be inputted, the tool compensation value input control unit 17 refers to machine configuration information stored in the machine configuration information storage unit 16 for the tool compensation item, and determines whether or not the machine configuration is such that an input value is to be subtracted from a tool compensation value that has already been set when the tool compensation value setting button [+INPUT RETREAT] is pressed. If the machine configuration is such that an input value is to be subtracted, the process proceeds to step B05. Otherwise, the current process is ended.

[Step B05]

The tool compensation value input control unit 17 inverses the sign of the input value for tool compensation and ends the current process.

[Step B06]

After checking a setting for a tool compensation number for which a tool compensation value is to be inputted, the tool compensation value input control unit 17 refers to a setting stored in the tool compensation information storage unit 15 for the tool compensation number for which a tool compensation value is currently to be inputted, and determines whether or not it is set to add an input value to a tool compensation value that has already been set when the tool compensation value setting button [+INPUT ADVANCE] is pressed. If it is set to add an input value, the current process is ended. Otherwise, the process proceeds to step B07.

[Step B07]

The tool compensation value input control unit 17 refers to a cutting edge direction setting stored in the tool compensation information storage unit 15, for the tool compensation number for which a tool compensation value is currently to be inputted, and determines whether or not the cutting edge direction is set such that an input value is to be added to a tool compensation value that has already been set when the tool compensation value setting button [+INPUT ADVANCE] is pressed. If the cutting edge direction is such that an input value is to be added, the current process is ended. Otherwise, the process proceeds to step B08.

[Step B08]

After checking a tool compensation item of a tool for which a tool compensation value is currently to be inputted, the tool compensation value input control unit 17 refers to machine configuration information stored in the machine configuration information storage unit 16 for the tool compensation item and determines whether or not the machine configuration is such that an input value is to be added to a tool compensation value that has already been set when the tool compensation value setting button [+INPUT ADVANCE] is pressed. If the machine configuration is such that an input value is to be added, the current process is ended. Otherwise, the process proceeds to step B05.

Figure 6:
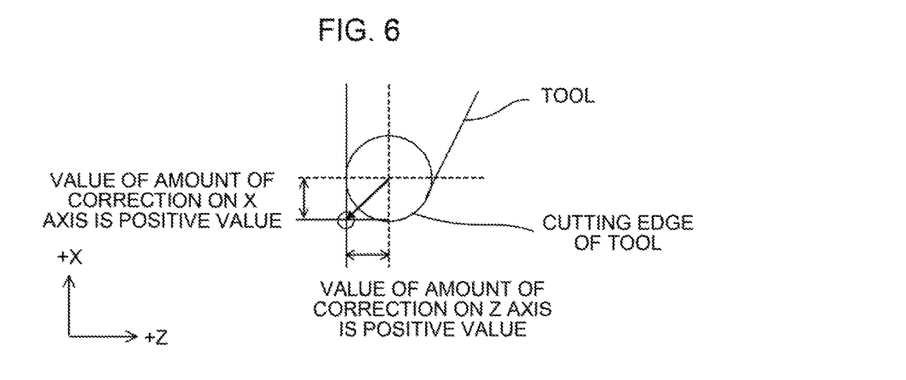
FIG. 6 is a diagram (1) illustrating a relationship between a direction of a cutting edge and correction of the tool compensation value.
Figure 7:
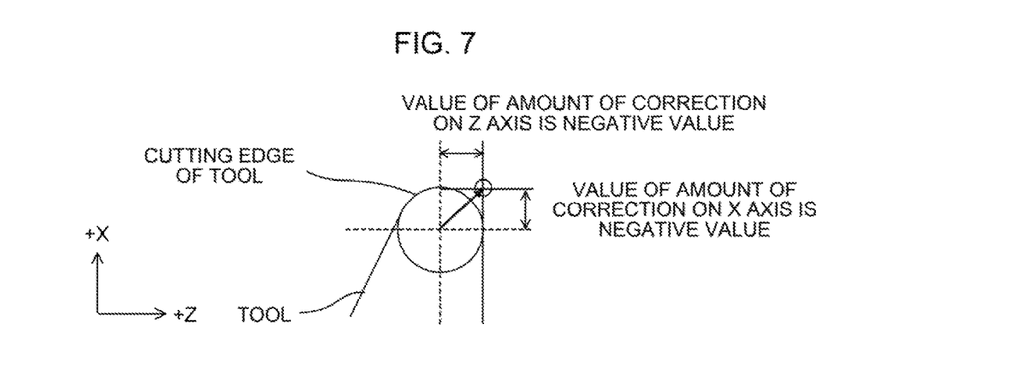
FIG. 7 is a diagram (2) illustrating a relationship between a direction of a cutting edge and correction of the tool compensation value.

FIGS. 6 and 7 show a cutting edge direction set for each tool compensation number in the tool compensation information storage unit 15 of the numerical controller 1 of the present embodiment.

In FIG. 6, when a cutting edge is oriented in a −Z direction and a −X direction on a Z-X plane, the tool compensation value is a positive value. Therefore, in order to bring the tool cutting edge close (advance the tool cutting edge) to a workpiece, an input value is subtracted from the tool compensation value that has already been set, whereas, in order to cause the tool cutting edge to be away (retreat the tool cutting edge) from the workpiece, an input value is added to the tool compensation value that has already been set. Thus, when the tool compensation value setting button [+INPUT ADVANCE] is used to input a tool compensation value, the input value is subtracted from a tool compensation value that has already been set; and, when the tool compensation value setting button [+INPUT RETREAT] is used to input a tool compensation value, the input value is added to the tool compensation value that has already been set.

In FIG. 7, when a tool cutting edge is oriented in a +Z direction and a +X direction on the Z-X plane, the tool compensation value is a negative value. Therefore, in order to bring the tool cutting edge close (advance the tool cutting edge) to a workpiece, an input value is added to the tool compensation value that has already been set, whereas, in order to cause the tool cutting edge to be away (retreat the tool cutting edge) from the workpiece, an input value is subtracted from the tool compensation value that has already been set is performed. Thus, when the tool compensation value setting button [+INPUT ADVANCE] is used to input a tool compensation value, the input value is added to a tool compensation value that has already been set. On the other hand, when the tool compensation value setting button [+INPUT RETREAT] is used to input a tool compensation value, the input value is subtracted from the tool compensation value that has already been set.

The same goes for a case where it is decided whether a value (a value of difference from a tool compensation value that has already been set) inputted with the use of the tool compensation value setting button [+INPUT ADVANCE]/[+INPUT RETREAT] is to be added to or subtracted from a tool compensation value, from the machine configuration information stored in the machine configuration information storage unit 16. It is decided based on whether a general cutting edge direction determined by a machine configuration is the plus (+) direction or the minus (−) direction of each coordinate system.

An embodiment of the present invention has been described so far. The present invention, however, is not limited to the example of the embodiment described above but may be implemented in various aspects by making appropriate changes.

The invention claimed is:

1. A numerical controller correcting a tool compensation value for a machine tool provided with a tool for machining a workpiece based on a numerical controller (NC) machining program, the numerical controller comprising:
   a tool compensation value setting screen for accepting an input value for correction of the tool compensation value;
   a tool compensation value input unit accepting an instruction for a correction direction of a cutting edge of the tool as seen from the workpiece, wherein the correction direction provides for a direction to place the cutting edge of the tool with respect to the workpiece; and
   a tool compensation value input control unit correcting the tool compensation value with the input value for correction, accepted on the tool compensation value setting screen, based on the correction direction of the cutting edge of the tool as seen from the workpiece, the correction direction being accepted by the tool compensation value input unit.

2. The numerical controller according to claim 1, wherein the correction direction of the cutting edge of the tool as seen from the workpiece includes at least any of a direction of bringing the cutting edge of the tool close to the workpiece and a direction of the cutting edge of the tool going away from the workpiece.

3. The numerical controller according to claim 1, further comprising a tool compensation information storage unit storing increase/decrease in the tool compensation value according to the correction direction of the cutting edge of the tool as seen from the workpiece in association with each tool; wherein
   the tool compensation value input control unit determines whether to perform correction of adding the input value to the tool compensation value or to perform correction of subtracting the input value from the tool compensation value, with reference to the tool compensation information storage unit.

4. The numerical controller according to claim 1, further comprising a tool compensation information storage unit in which, for each tool, a direction of a cutting edge of the tool is set and stored; wherein
   the tool compensation value input control unit determines whether to perform correction of adding the input value to the tool compensation value or to perform correction of subtracting the input value from the tool compensation value, with reference to the tool compensation information storage unit.

5. The numerical controller according to claim 1, further comprising a machine configuration information storage unit in which a general cutting edge direction is set for each machine; wherein
   the tool compensation value input control unit determines whether to perform correction of adding the input value to the tool compensation value or to perform correction of subtracting the input value from the tool compensation value, with reference to the machine configuration information storage unit.

6. The numerical controller according to claim 3, wherein
   whether the input value for correction is to be inputted as a diameter value or as a radius value is settable for each tool in the tool compensation information storage unit; and
   the tool compensation value input control unit determines whether the input value is to be treated as a diameter value or a radius value with reference to the tool compensation information storage unit.

* * * * *